United States Patent
Hartmann et al.

(10) Patent No.: US 8,504,500 B2
(45) Date of Patent: Aug. 6, 2013

(54) SYSTEMS, METHODS, AND APPARATUS FOR RECONSTRUCTION OF 3-D OBJECT MORPHOLOGY, POSITION, ORIENTATION AND TEXTURE USING AN ARRAY OF TACTILE SENSORS

(75) Inventors: Mitra J. Hartmann, Evanston, IL (US); Joseph H. Solomon, Park Ridge, IL (US)

(73) Assignee: Northwestern University, Evanston, IL (US)

( * ) Notice: Subject to any disclaimer, the term of this patent is extended or adjusted under 35 U.S.C. 154(b) by 312 days.

(21) Appl. No.: 12/847,822

(22) Filed: Jul. 30, 2010

(65) Prior Publication Data
US 2011/0029470 A1 Feb. 3, 2011

Related U.S. Application Data

(60) Provisional application No. 61/229,991, filed on Jul. 30, 2009.

(51) Int. Cl.
*G06F 15/18* (2006.01)
*G06N 3/02* (2006.01)

(52) U.S. Cl.
USPC ............................................. 706/16; 706/15

(58) Field of Classification Search
None
See application file for complete search history.

(56) References Cited

U.S. PATENT DOCUMENTS

| | | | |
|---|---|---|---|
| 6,014,652 A | 1/2000 | Hill et al. | |
| 2008/0235972 A1 | 10/2008 | Hartmann et al. | |
| 2009/0133508 A1 | 5/2009 | Johansson et al. | |
| 2010/0071222 A1 | 3/2010 | Solomon et al. | |

FOREIGN PATENT DOCUMENTS

JP 2002116101 A 4/2002

OTHER PUBLICATIONS

Schultz A. et al. "Multifunctional Whisker Arrays for Distance Detection, Terrain Mapping, and Object Feature Extraction", Proceedings of the 2005 IEEE International Conference on Robotics and Automation, Barcelona, Spain, pp. 2588-2593, Apr. 2005.*
Russell R. et al. "Object Location and Recognition using Whisker Sensors", Australasian Conference on Robotics and Automation, pp. 1-9, 2003.*
Fend M. "Whisker-Based Texture Discrimination on a Mobile Robot", ECAL 2005, pp. 302-311.*
Yokoi H., "Artificial Whiskers: Structural Characterization and Implications for Adaptive Robots", Journal of Robotics and Mechatronics, vol. 17, No. 5, pp. 584-595, 2005.*
Fend M. et al.,"An Active Artificial Whisker Array for Texture Discrimination", Proceedings of the 2003 IEEE/RSJ Intl. Conference on Intelligent Robots and Systems, Las Vegas, Nevada, Oct. 2003, pp. 1044-1049.*
Kim D. et al., "Biomimetic Whisker Experiments for Tactile Perception", Proceedings of the International Symposium on Adaptive Motion in Animals and Machines, pp. 1-7, 2005.*

(Continued)

*Primary Examiner* — Jeffrey A Gaffin
*Assistant Examiner* — Dave Misir
(74) *Attorney, Agent, or Firm* — Hanley, Flight & Zimmerman, LLC

(57) ABSTRACT

Systems, methods, and apparatus are provided using signals from a set of tactile sensors mounted on a surface to determine the three-dimensional morphology (e.g., size, shape, orientation, and/or position) and texture of objects of arbitrary shape. Analytical, numerical, and/or neural network approaches can be used to interpret the sensory data.

27 Claims, 12 Drawing Sheets

OTHER PUBLICATIONS

Kim D. et al., "Biomimetic whiskers for shape recognition", Robotics and Autonomous Systems, vol. 55, pp. 229-243, 2007.*

Bebek O. et al., "Whisker Sensor Design for Three Dimensional Position Measurement in Robotic Assisted Beating Heart Surgery", IEEE International Conference on Robotics and Automation, Roma, Italy, Apr. 2007, pp. 225-231.*

Kaneko M. et al., "3-D Active Antenna for Contact Sensing", IEEE International Conference on Robotics and Automation, pp. 113-119, 1995.*

Solomon J. et al., "Robotic whiskers used to sense features", Nature, vol. 443, Oct. 5, 2006, p. 525 and supplementary information pp. 1-12.*

Scholz G. et al., "Profile Sensing With an Actuated Whisker", IEEE Transactions on Robotics and Automation, vol. 20, No. 1, Feb. 2004, pp. 124-127.*

Lee M. et al., "Tactile sensing for mechatronics—a state of the art survey", Mechatronics, vol. 9, pp. 1-31, 1999.*

Fend et al, "On the influence of morphology of tactile sensors for behavior and control," Robotics and Autonomous Systems, Elsevier Science Publishers, Amsterdam, NL, vol. 54, No. 8, Aug. 31, 2006, pp. 686-695 (10 pages).

Lee et al., "Review Article Tactile sensing for mechatronics—a state of the art survey," Mechatronics, Pergamon Press, Oxford, GB, vol. 9, No. 1, Feb. 1, 1999, pp. 1-31 (31 pages).

International Searching Authority, "International Search Report and Written Opinion," issued in connection with counterpart international application No. PCT/US2010/043980, mailed Oct. 25, 2010 (15 pages).

International Bureau "International Preliminary Report on Patentability," issued in connection with International Application Serial No. PCT/US2010/043980, mailed on Jan. 31, 2012, 7 pages.

* cited by examiner

SYSTEMS, METHODS, AND APPARATUS FOR RECONSTRUCTION OF 3-D OBJECT MORPHOLOGY, POSITION, ORIENTATION AND TEXTURE USING AN ARRAY OF TACTILE SENSORS

CROSS-REFERENCE TO RELATED APPLICATIONS

The present application claims priority to U.S. Provisional Application No. 61/229,991, filed on Jul. 30, 2009, which is herein incorporated by reference in its entirety.

STATEMENT REGARDING FEDERALLY SPONSORED RESEARCH OR DEVELOPMENT

This invention was made with government support under Grant Numbers IIS-0613568 and IOS-0818414 awarded by the National Science Foundation. The government has certain rights in the invention.

FIELD OF INVENTION

The presently described technology generally relates to tactile sensing. In particular, the presently described technology relates to systems, methods, and apparatus for three-dimensional reconstruction using an array of tactile sensors.

BACKGROUND

Whiskers have attracted increasing interest from engineers seeking to imitate their numerous desirable sensing properties. Whiskers are physically robust, mechanically simple, and yet can precisely extract object shape, texture and the velocity of fluid flow. The diverse capabilities of whiskers are amply demonstrated by the animals that use them to perform difficult behavioral tasks. Robotic whiskers have been used for various types of sensing tasks (for a detailed review), and several recent studies have specifically addressed the issue of three-dimensional (3-D) feature extraction, wherein the goal is to infer the shape of an object by repeated contact with one or more whiskers. These studies have generally taken one of two approaches: whisker "tapping" or whisker "sweeping."

Whisker tapping involves rotating or translating the whisker(s) against an object by a small angle and inferring where along the length of the whisker initial contact occurred (i.e., radial distance extraction). Using this information, along with information about the angle of initial contact and location of the whisker base, allows estimation of the contact point location in 3-D space for each whisker.

Whisker sweeping involves moving the whisker along or against the object far past the location of initial contact in order to estimate a collection of contact point locations as the whisker slips along the surface.

BRIEF SUMMARY

Certain examples provide a computer-implemented method for three-dimensional object reconstruction using an array of tactile sensors. The method includes receiving sensory data from the array of tactile sensors with respect to contact with an object of arbitrary shape in a reference coordinate system. The method also includes processing the sensory data using a neural network to estimate a coordinate for each contact point between the array of tactile sensors and the object. The method includes reconstructing a three-dimensional morphology of the object based on the sensory data processed using the neural network. The method includes outputting the three-dimensional morphology of the object.

Certain examples provide a tangible computer readable medium comprising computer program code which, when executed by a processor, implements a method for three-dimensional object reconstruction using an array of tactile sensors. The method includes receiving sensory data from the array of tactile sensors with respect to contact with an object of arbitrary shape in a reference coordinate system. The method also includes processing the sensory data using a neural network to estimate a coordinate for each contact point between the array of tactile sensors and the object. The method includes reconstructing a three-dimensional morphology of the object based on the sensory data processed using the neural network. The method includes outputting the three-dimensional morphology of the object.

Certain examples provide a three-dimensional reconstruction system. The system includes an array of tactile sensors to contact an object of arbitrary shape to obtain sensory data regarding the object. The system includes a processor to provide a neural network to process the sensory data to estimate a location for each contact point between a sensor in the array of sensors and the object. The processor is to reconstruct a three-dimensional morphology of the object based on the sensory data processed using the neural network and output the three-dimensional morphology of the object to a user.

Figure 1:
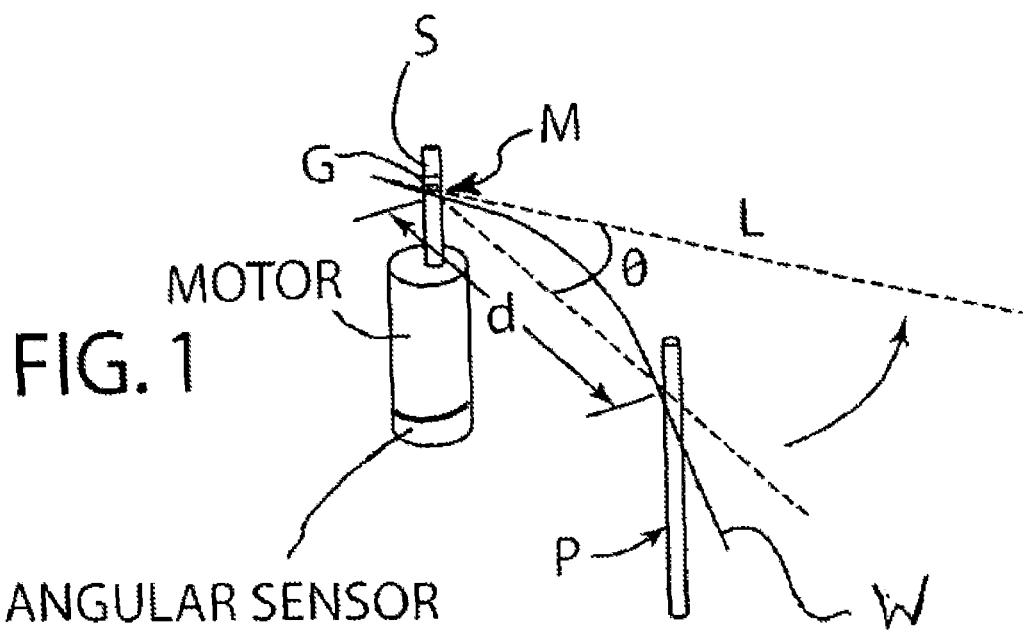
FIG. 1 is a schematic view of sensing device having a whisker element rotated by motor against an object.

The following detailed description of certain embodiments will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF CERTAIN EMBODIMENTS

Although the following discloses example methods, systems, articles of manufacture, and apparatus including, among other components, software executed on hardware, it should be noted that such methods and apparatus are merely illustrative and should not be considered as limiting. For example, it is contemplated that any or all of these hardware and software components can be embodied exclusively in hardware, exclusively in software, exclusively in firmware, or in any combination of hardware, software, and/or firmware. Accordingly, while the following describes example methods, systems, articles of manufacture, and apparatus, the examples provided are not the only way to implement such methods, systems, articles of manufacture, and apparatus.

When any resulting claims are read to cover a purely software and/or firmware implementation, in at least one example, at least one of the elements is hereby expressly defined to include a tangible medium such as a memory, DVD, Blu-ray, CD, etc. storing the software and/or firmware.

Certain examples provide reconstruction of 3-D object morphology, position, orientation and texture using an array of tactile sensors.

In certain examples, signals that come from a set of tactile sensors mounted on a surface are used to determine the three-dimensional (3-D) morphology (including size, shape, orientation, position) and texture of objects of arbitrary shape. The algorithm used to interpret the sensory data may include analytical, numerical, and/or neural network approaches.

The tactile sensors may be flexible and resemble hair, whiskers, and/or antenna. Sensors may be embedded in the surface to form a more skin-like structure, or they may be a combination of any of these implementations, for example. In the case that the tactile sensors are hair-like, whisker-like or antenna-like, they may have sensors all along their length and/or they may have sensors at their base.

The surface on which the tactile sensors are mounted may be rigid, or it may be flexible and/or deformable. The sensors themselves may be flexible and/or deformable. The internal distribution of stresses and strains within the surface may also be measurable. The surface (and attached sensors) may be moved with any numbers of degrees of freedom against an object, and/or an object may be moved against the surface (and attached sensors) with any numbers of degrees of freedom. The sensors themselves may be actuated or static with respect to the surface which may or may not itself move. The described technologies can accommodate for movement of the array with respect to the object, the object respect to the whisker, and both simultaneously.

The sensors themselves may be actuated or static with respect to the surface. The signals coming from the sensors may be sensed by technologies that include but are not limited to the following: vision-based, photo-interrupter, photoelastic, magneto-sensing, strain gage, capacitive, binary, force/torque load cell, piezoelectric, and Hall effect.

There is no restriction on the type of algorithm used to interpret the sensory data, which may include analytical, numerical, and/or neural network approaches. Within the neural network approach, a variety of network topologies, neuron models, and training algorithms may be used. Some specific examples include: Multilayer perception, with or without feedback; Radial basis function (RBF) network; Hopfield network; Elman network; Stochastic neural network; Continuous time recurrent neural network; Topology and Weight Evolving Artificial Neural Network (TWEANN); Compositional Pattern Producing Network (CPPN), etc. Analytic and/or numerical approaches may also be "hybridized" into a neural network framework, by using their outputs as network inputs (e.g., "features").

The scale and shape of the sensors, including total arc length, diameter profile (e.g., as a function of arc length), and curvature profile are not constrained. The scale, shape, and configuration of the sensing array is not limited. The technology can work over any spatial scale. The number of sensors is not limited.

If a system has the capacity to measure full 3-D force and moment at the base of a whisker and a single point contact is assumed, then the Euler-Bernoulli equation can be integrated (e.g., starting from the base) to compute the full shape of the whisker and the location of the contact point.

The same algorithmic and neural network techniques can apply equally well to deformable membrane surfaces (e.g., skin). Such a membrane can be covered or embedded with sensors, and network(s) can learn to infer the surface shape from the sensor signals.

3-D surface representation is not limited to any particular mathematical framework. For example, representations can be applied to frameworks such as 3-D contact point collections, tri-meshes, geometrical primitives, radial basis function network, artificial neuronal place cell firing rates, etc.

Classical elasticity theory can be used to model a whisker element W as a cylindrical beam bending against a rigid, motionless object (shown in FIG. 1 as peg P) and to derive a monotonic relationship between radial contact distance d, a pushing angle θ, and moment M (e.g., torque) at a whisker base (see FIG. 1). Through either rotation or translation (or a combination of these motions) of the whisker at or near the base region thereof (where the moment sensor resides) against an object, an initial point that the whisker touches along the object during the whisker's movement can be computed. The derivation can alternately be conducted in terms of force instead of moment, and/or translation instead of rotation. Although description in provided with respect to determining a change in moment at the base region of the whisker element as a result of bending, this is offered for purposes of illustration and not limitation. Other examples can be practiced by determining a change in curvature or other deflection of the whisker element at the base region (or other region). The whisker element, the object, or both can be moved to provide relative motion there between.

Each whisker rotates or translates about its base, where the bending moment is measured. It can be convenient, but it is not necessary, to allow all whiskers to rotate or translate in unison, thus allowing for a simple array design that requires only a single motor for actuation. A change in contact point location can be incrementally inferred through continuous measurement of torque (e.g., bending moment) at the whisker base. Each whisker rotates or translates about its base, where the bending moment is measured. It can be convenient, but it is not necessary, to allow all whiskers to rotate or translate in unison, thus allowing for a simple array design that requires only a single motor for actuation. Co-pending application Ser. No. 11/906,751 filed Oct. 3, 2007, discloses a method for performing initial contact point measurement under such conditions or constraints. Co-pending application Ser. No. 12/455,389 extends the method of co-pending application Ser. No. 11/906,751 and allows continued estimation of contact point beyond initial contact with an object using only measurement of moment (e.g., torque) to iteratively infer successive contact point locations, thus providing the maximum amount of available shape information per whisk.

There are two ways, for example, that a whisker can slip along an object. Lateral slip occurs when the object surface at the contact point is slanted relative to the plane of rotation and the angle of the friction cone is not large enough to prevent out-of-plane movement. Longitudinal slip occurs when the curvature of the object within the plane of rotation at the contact point is finite (e.g., not a point-object or an object's corner). Conveniently, longitudinal slip affords the opportunity to sense additional contact points as the whisker slips along the object periphery, providing further information about object shape over a single whisk.

The above definitions of lateral and longitudinal slip describe the movement of the contact point along the object in Euclidean space. The contact point can also move along the whisker, even in the absence of lateral and/or longitudinal slip. For example, if a whisker rotates in a plane against a point object, the location of contact on the whisker will change, but the location of object contact will remain constant. This type of contact-point movement on the whisker is termed axial slip.

In certain examples, consistently reliable object distance extraction in the presence of significant surface slopes includes a reasonable estimate of a friction coefficient between a whisker element and an object. There are three methods, for example, by which an estimate of friction can be obtained. First, if an orientation of the entire whisker array can be tilted along an x-axis of any particular whisker, whisks can be performed against the object at a variety of orientations, effectively adjusting the surface slope. A range of slopes is provided for which $\phi=0°$ would be equal to $2\alpha$ (the accuracy depending on how gradually the orientation was adjusted). This essentially amounts to an in-field test of the object to determine the friction coefficient, where $\alpha$ represents a friction cone angle. Second, an array can explore an object and repeat feature extraction to transform contact points into a 3-D object shape (e.g., splining) using a range of friction coefficients. The one that leads to the most consistent contact point positions and thus the smoothest surface is kept. Third, the array can whisk against the object at a variety of array orientations. All the contact points sampled are given a confidence measure related to $\phi$, such that points with large $\phi$ are ignored or have less influence on the feature extraction algorithm. Note that methods 1 and 2 assume the friction coefficient is consistent over the entire object, while method 3 does not.

In some examples, contact can occur at the whisker tip or end. Such cases may result in increased rotational compliance, causing equation 1 to estimate object distance, $d_x$ (wherein $d_x=r_{w,t}$), to be greater than the whisker length. A solution is to give $d_x$ a threshold equal to whisker length. It is also worth noting that regions of an object that are concave with respect to the plane of whisker rotation can be sampled through tip contact with a straight whisker. Tip contact can thus be desirable for at least two reasons: it potentially helps provide a very precise measurement of contact distance (since the whisker length is fixed), and allows concave regions of an object to be sampled.

Figure 2:
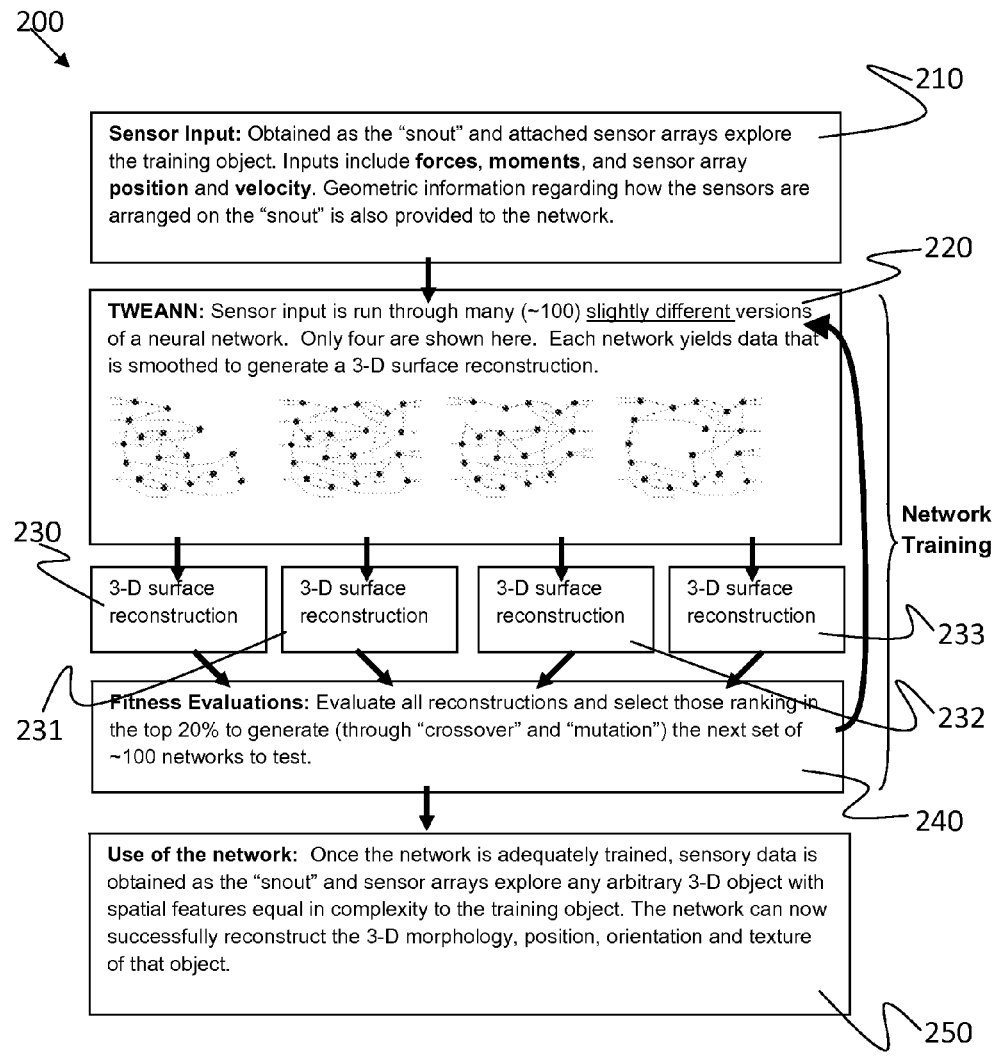
FIG. 2 illustrates an example flowchart of a method to train a network to perform 3-D reconstruction.

One particular non-limiting instantiation of example technology is depicted in the flowchart of FIG. 2. FIG. 2 illustrates a flow diagram for a method 200 for network training to reconstruct the 3-D morphology, position, orientation and texture of an object.

As illustrated in the example network training process 200, evolutionary learning occurs over several (e.g. 100) "generations" or iterations. The example shown in FIG. 2 uses a TWEANN network, but other examples are not limited to a TWEANN network.

In the example of FIG. 2, an array of whisker-like sensors is arranged on a hemispherical surface (e.g., the "snout") whose tip (X, Y, Z) position and ($\Theta$, $\Phi$, $\Psi$) orientation is known at all times in laboratory or reference coordinates. The tip position and orientation can be determined either absolutely, or through a "dead-reckoning" approach in which incremental movements are added to the original position and orientation.

At 210, sensor input is obtained as the "snout" and attached sensor arrays explore the training object. Inputs include forces, moments, position (e.g., sensor array position), and velocity. Geometric information regarding how the sensors are arranged on the "snout" is also provided to the network.

At 220, sensor input is run through many (e.g., approximately 100) slightly different versions of a neural network (e.g., a TWEANN network). Only four are shown here for purposes of illustration. Each network yields data that is smoothed to generate a 3-D surface reconstruction.

At 230-233, 3-D surface reconstruction is performed for each neural network sensor input. At 240, fitness evaluations are conducted for all reconstructions to select the reconstruction(s) ranking in the top 20% to generate (e.g., through "crossover" and "mutation") the next set of approximately 100 networks to test.

At 250, once a network is adequately trained, sensory data is obtained as the "snout" and sensor arrays explore an arbitrary 3-D object with spatial features equal in complexity to the training object. The network can successfully reconstruct the 3-D morphology, position, orientation and texture of that object.

Figure 3:
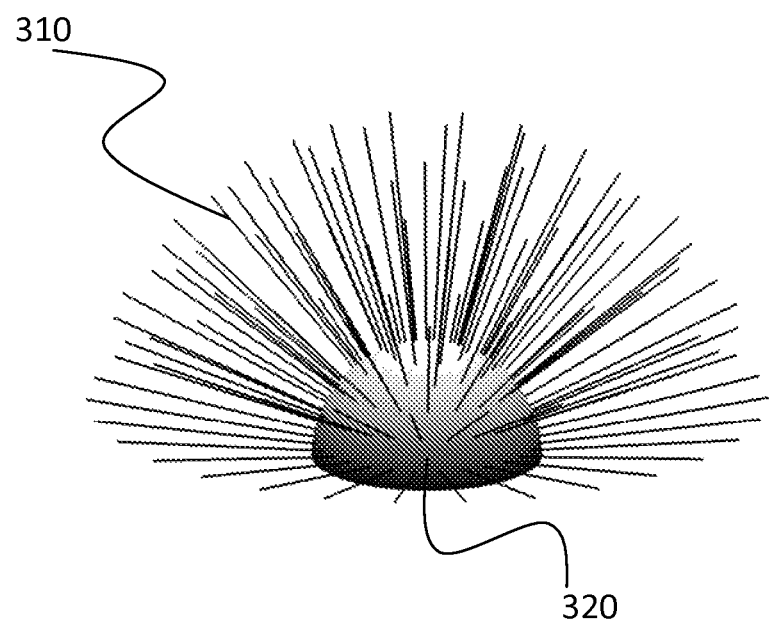
FIG. 3 illustrates an example whisker sensor array.

In this example, a total of 100 straight, tapered flexible whiskers emerge from the snout in a regular, grid-like fashion, as shown in FIG. 3. The number of whiskers could be as few as 1 or as many as desired. Each whisker is equipped with a two-axis torque sensor, enabling it to sense moments at the base ($M_y$, $M_z$) caused by deflections in the two directions orthogonal to the whisker's longitudinal axis. As shown in FIG. 3, a whisker (sensor) array 310 is mounted on the "snout" 320. In this example, there are five rows of whiskers, and the whiskers are distributed in equal increments within each row.

Figure 4:
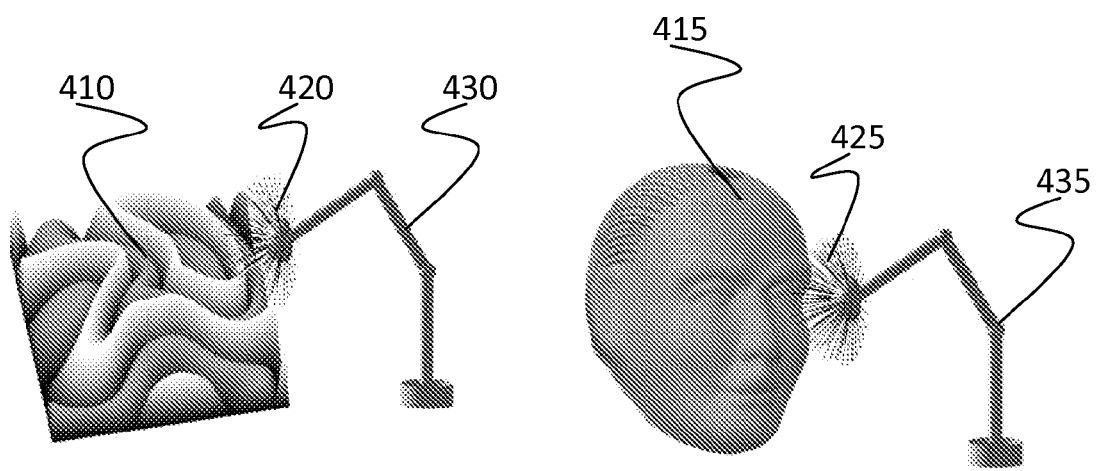
FIG. 4 illustrates example 3-D object sensing and morphology.

In an example application, a goal is to extract the 3-D surface morphology (e.g., shape contours) of an arbitrary object 410, 415. A snout 420, 425 can be attached to a support 430, 435, such as a PUMA 560 style robot arm, as shown in FIG. 4, allowing the array 420, 425 to be moved to an arbitrary position and orientation within a given workspace. The feature extraction process is divided into a series of "bouts." Between bouts, the array 420, 425 is moved to some desired position/orientation by the robot arm 430, 435. During bouts, the arm 430, 435 uses a single degree of freedom at the wrist to rotate the array 420, 425 back and forth against the object surface 410, 415.

For each whisker, a role of the neural network is to estimate the location of the contact point with respect to its base in spherical coordinates. Hence, on each time step t, each whisker w has three outputs which represent the position of the contact point in local spherical coordinates: ($r_{w,t}$, $\theta_{w,t}$, $\phi_{w,t}$). These local spherical coordinates are converted to the laboratory/reference frame, and smoothly interpolated using a smoothing spline to reconstruct the surface morphology.

A neural network is provided to output the local contact point locations, such that they closely overlie the actual surface being sensed. In this example, a Topology and Weight Evolving Artificial Neural Network (TWEANN) is used, which is a class of neural network that learns both the topology and weights for a given task using an evolutionary learning framework. Because networks within a given row are symmetrically arranged on the snout, only a single network needs to be evolved for each row, for a total of five networks. Inputs to each network include the following: $M_y$, $M_z$; $M_y$-dot and $M_z$-dot, time derivatives of $M_y$ and $M_z$; $\alpha$, a change in rotation angle since previous contact (e.g., obtained directly from movement of the snout); α-dot, an angular speed of rotation; β, an angle of the whisker base's longitudinal axis with respect to the plane of rotation (fixed during a given rotation); and a bias term (e.g., 1.0). β is obtained directly from the geometry of the mounting of the sensors on the snout, for example.

For other networks and whisker/antenna instantiations, inputs can also include any of the following variables: higher temporal derivatives of any of the variables listed above; $M_x$ and all of its temporal derivatives; all components of force at the whisker base ($F_x$, $F_y$, $F_z$) and their temporal derivatives; if the whisker/antenna/haircell has sensors along its length, then all forces and moments along its length; and any sensor reading whose units are not directly convertible to force or torque, e.g. several of the sensor technologies mentioned above.

In addition, each network is allowed to evolve connections from nodes of neighboring whiskers' networks. The neighboring whiskers may be from within the row or from either neighboring row, for example.

Training of the networks involves the use of a "training object" that possesses a variety of intricate features of varying spatial frequency and curvature. An example of a training object 410 is shown on the left side of FIG. 4.

In the example of FIG. 4, the "snout" 420 with attached sensors is mounted on a robot arm 430 or other support and explores the training object 410. Once the network is adequately trained, the snout and sensor array can explore any arbitrary 3-D object (e.g., the "test" object 415) and the 3-D morphology as well as position, orientation, and texture can be reconstructed.

Training of the neural network involves the use of one or more "training objects" 410 that possess a variety of intricate features of varying spatial frequency, and for which a geometric description is precisely known, e.g. as a wire-frame model. Such training objects 410 can include various complex real-world objects whose assortment of features are empirically found to encompass those that are expected to be encountered in practice, and/or custom-engineered objects that are designed to cover some given range of spatial frequencies. For example, if it is known that the whisker array will be used to sense the external morphology of a human heart, then a model of the human heart could be used. Alternatively, if the types of object to be encountered are less well-defined, then training over custom-engineered test objects is an option.

There may be some trade-off between the degree of mathematical rigor employed to ensure that the test objects cover all spatial frequencies within some range, and the pragmatic benefit of constructing test objects that cover a more limited frequency range, but possess a spatial structure that more closely reflect the natural statistics of real-world objects. The former case can involve using a random number generator to create band-limited white noise, and transferring that signal into a two-dimensional (2-D) height-map, for example. The latter case can involve using a Compositional Pattern Producing Network (CPPN) to create height-map patterns that involve repetition, symmetry, and curved ridges, for example. An example of the CPPN case is shown in the left side of FIG. 4.

During the network training, the robot arm 430 positions the sensor array 420 at a variety of positions/orientations in front of the training object 410, and brush the whiskers against it 410 a number of times (e.g., five). The data gathered will then be used to train the TWEANN with the goal of having the extracted contact points match up as closely as possible with the surface of the training object 410.

To train the TWEANN involves a series of fitness evaluations. Each fitness evaluation involves running the training data through the TWEANN network, and computing the sequence of 3-D contact points in the laboratory coordinate system. The fitness function includes a positive constant value (e.g. whisker length) minus an average Cartesian distance between each extracted contact point and a closest point to it on the training object surface, which involves a geometric computation. Hence, by selecting for high fitness, increasingly accurate feature extraction results as the networks evolve. Note that, to increase the speed of the evolutionary learning, data from only a random subset of the whisks can be evaluated for each network on each fitness evaluation.

Once the network has been appropriately trained, it can be used to extract the morphology of any arbitrary "test object" 415. The test object 415 can have a more simple surface complexity than the training object 410, or it can have a surface complexity similar to that of the training object 410. An example of a "test" object 415 is shown on the right side of FIG. 4, in this case, a small sculpted head. So long as the training object possesses a large enough variety of surface features, similar feature extraction accuracy can be observed on the test object 415.

Figure 5:
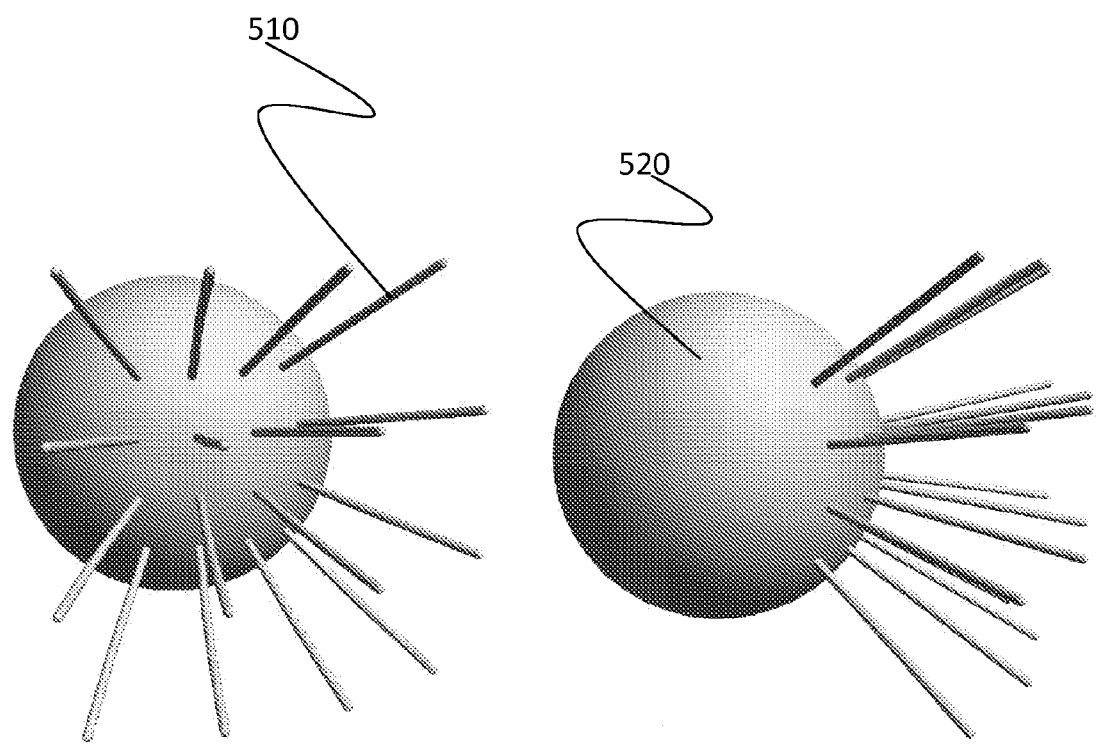
FIG. 5 shows an example whisker sensor array.

In an example, whisker-based 3-D surface reconstruction is enabled by training neural networks to generate estimations of 3-D contact point locations between a simulated array of whiskers and a randomly shaped test object, as the array brushes against the surface in an unpredictable way. The whisker array, shown, for example, in FIG. 5, includes a 4×4 configuration of straight, cylindrical whiskers 510, mounted on a spherical base (e.g., the "snout") 520.

In an example training process, two objects are involved: one object for gathering data to train the neural networks, and one object for evaluating the spatial accuracy of the networks in estimating contact points. The objects 610, 620, shown in FIG. 6, are generated using a smoothed, 2-D version of a "random walk" algorithm, giving them smoothly-varying, unpredictable contours.

Figure 6:
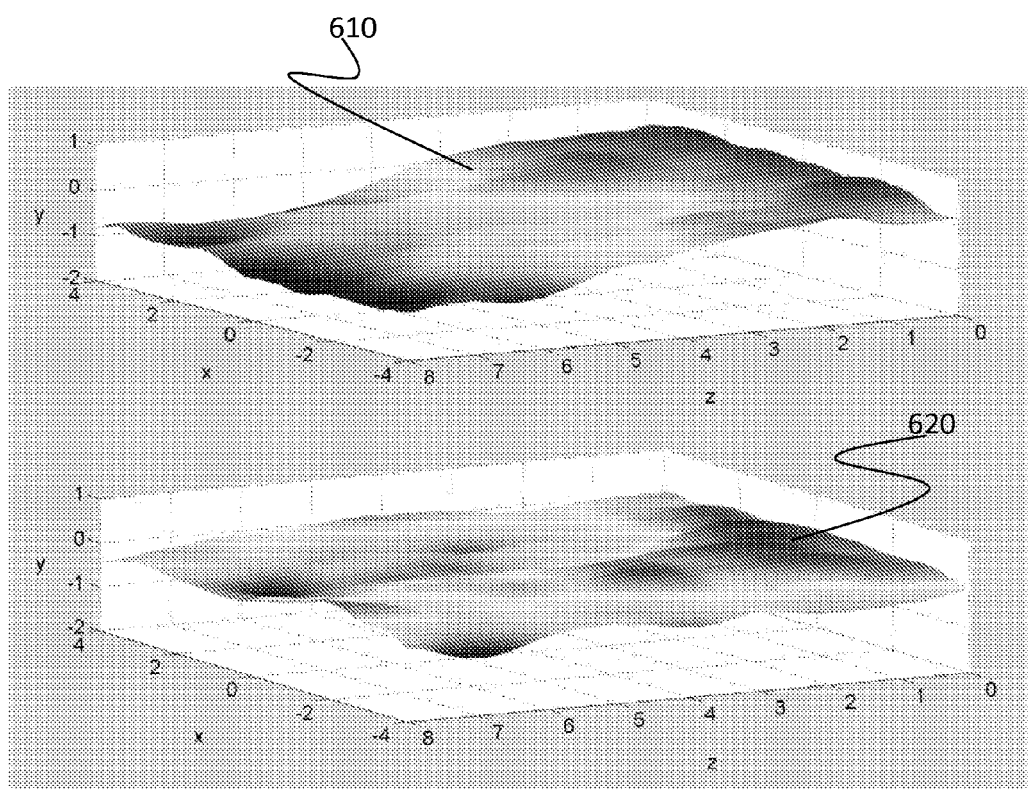
FIG. 6 depicts heightfields representing training and test objects.

As shown in the example of FIG. 6, heightfields are shown representing a training (top) object 610 and a test (bottom) object 620. The axes are in units of whisker length. Color scales with the y-value.

Movement trajectories of the whisker array are similarly generated using a smoothed, range-constrained, one-dimensional (1-D) version of the random walk algorithm. Six movement trajectories, shown in FIG. 7, are generated for both objects, and are interpreted as the (X, Y, Z) position 710 and (Θ, Φ, Ψ) Euler angles 720 describing a center of the snout.

Figure 7:
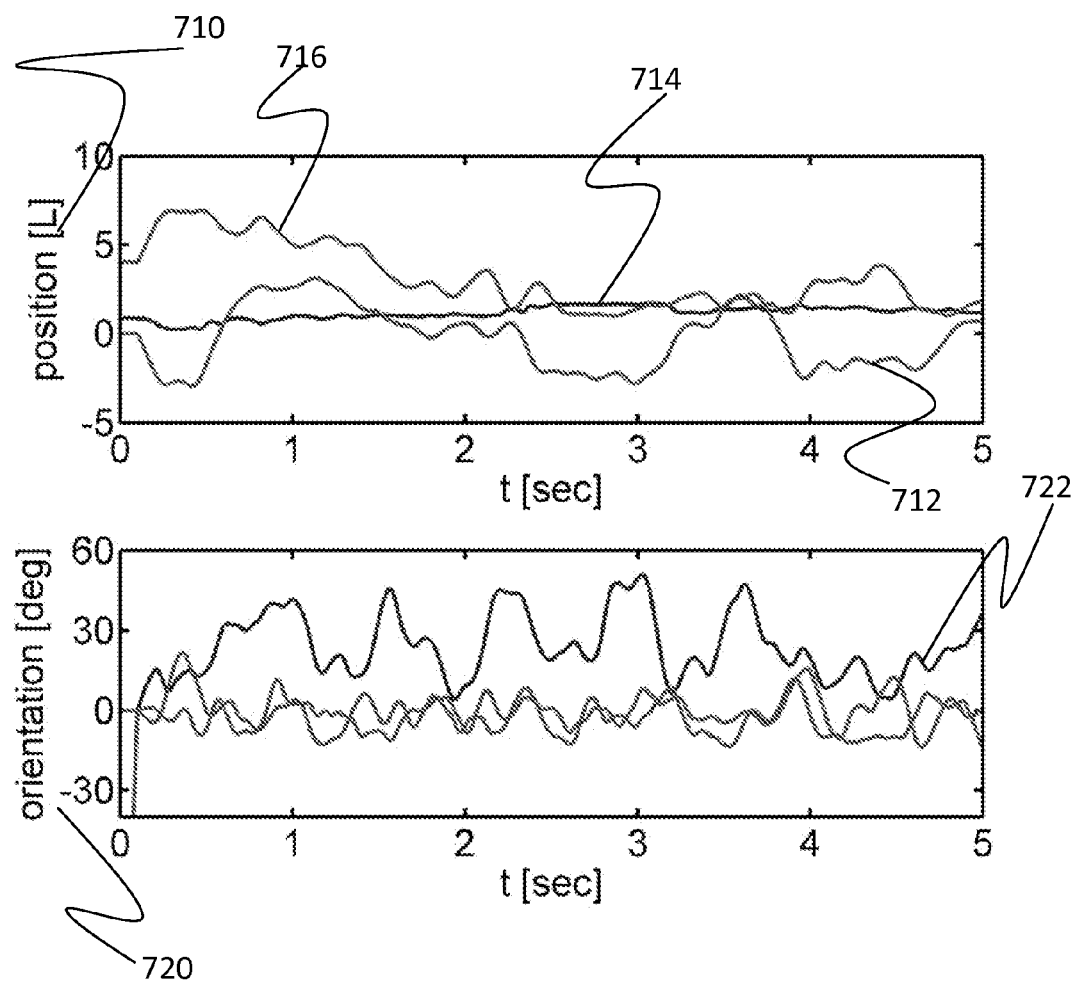
FIG. 7 shows whisker array trajectories for a training object.

FIG. 7 depicts an example whisker array trajectory for a training object. The trajectory 710 of whisker array position includes a green trace indicating an x-position 712, a blue trace indicating a y-position 714, and a red trace indicating a z-position 716. Position is normalized by whisker length. The trajectory 720 of whisker array orientation is measured in terms of three Euler angles. A blue trace 722 represents an angle about the tangent to the whisker base.

In an example, simulations are programmed using an Open Dynamics Engine (ODE), which is an industrial quality, open-source multi-body dynamics modeling software package. Simulations can be run using any dynamics software, for example. Additionally, these algorithms apply equally well to data obtained from a hardware array of whiskers.

Figure 8:
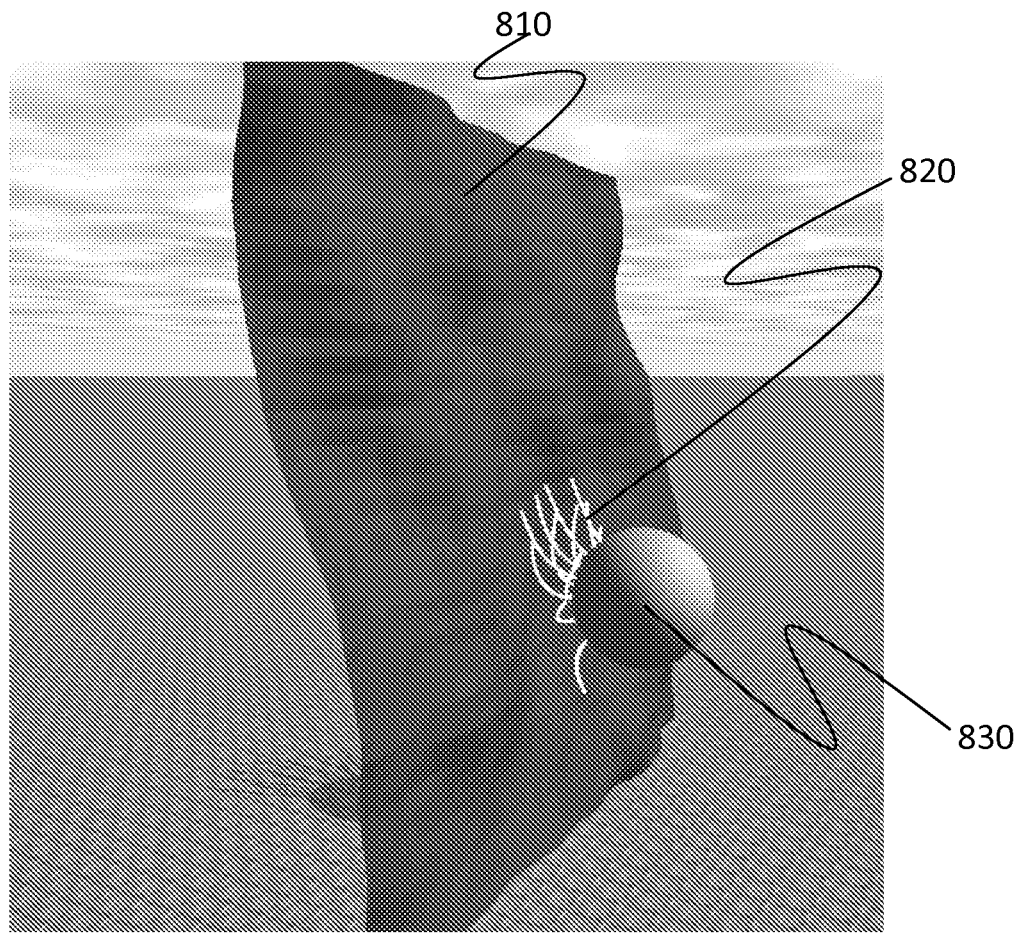
FIG. 8 illustrates a simulated whisker array brushing against a training object in an Open Dynamics Engine.

FIG. 8 shows the array 830 as it moves along a surface of a training object 810. In the example of FIG. 8, whiskers 820 are programmed using a series of ten capped cylinder geometries, connected with spring-damper elements to simulate the inherent stiffness and damping characteristics of the whisker material.

A Contact Point Estimation (CPE) algorithm, as implemented in the example of FIG. 8, works as follows. On each time step t and for each whisker w, the location of a contact point is estimated in spherical coordinates $(r_{w,t}, \theta_{w,t}, \phi_{w,t})$ relative to the base of the associated whisker, where r is the distance from the whisker base to the contact point, θ is the "inclination" angle of the contact point (measured relative to the whisker's local x-axis, which is tangent to the whisker at its base), and φ is the "azimuth" angle. Using a known position and orientation of a snout, these local spherical coordinates are converted to the laboratory frame to give the absolute contact point location $(x_{w,t}, y_{w,t}, z_{w,t})$.

The algorithm also outputs a "confidence" value $C_{w,t}$ between −1 and 1 that is associated with the contact point. If the confidence is less than zero, the contact point is ignored. Otherwise the contact point is retained, along with its associated non-unity confidence. The justification for using the confidence value is two-fold:

1. Often, the whisker is not in contact with an object surface, and this condition must be detected (e.g., $C_{w,t}<0$) such that no contact point is inferred.
2. Under certain contact conditions, the precise location of a contact point may be difficult to consistently determine with high accuracy; $C_{w,t}$ will thus indicate the reliability of the associated contact point.

In certain examples, Multi-layer Perceptron (MLP) neural networks are used to generate estimates for $r_{w,t}, \phi_{w,t}$, and $C_{w,t}$. The particular inputs for each of the networks is described in Table 1, where $$M_{yz} = \sqrt{M_y^2 + M_z^2} \quad (1)$$

is a combined magnitude of the two primary components of moment, $F_x$ is the axial force magnitude, and the bias is a constant unity input. Feedback connections from the outputs nodes to the hidden nodes were also used, allowing the networks to integrate past sensory information.

TABLE 1

Neural network input variables for each of the three networks (r, φ, C).

|   | $M_{yz}$ | $F_x$ | $\dot{M}_{yz}$ | bias (1) | feedback |
|---|---|---|---|---|---|
| r | X | X |   | X | X |
| φ | X | X |   | X | X |
| C | X | X | X | X | X |

The inclination angle θ does not involve a neural network because, in most contact situations, the whisker deforms primarily within a plane, whose orientation can be analytically computed using $$\theta = a\tan 2(M_z, M_y). \quad (2)$$

where a tan 2 is the four quadrant arctangent of the elements of $M_z$ and $M_y$. Further accuracy can be obtainable using a neural network to refine this analytic approximation.

The neural networks for r and φ use $M_{yz}$, $F_x$ and the bias as inputs based on analytic results regarding the end-loaded cantilever problem (e.g., with zero inclination of the contact force), which indicate that the mappings from $(M_{yz}, F_x)$ to r and to φ are injective functions. Although some assumptions of the analytic model may be violated in practice (e.g., the whiskers possess intrinsic dynamic properties, and the presence of friction and the possibility of contact along the whisker tips lead to violation of the assumption regarding non-zero inclination of the contact force), cases where the contact point locations are overly ambiguous can be ignored through the use of the confidence metric. The confidence network additionally uses $\dot{M}_{yz}$ as an input to exploit the context-dependent correlation between $\dot{M}_{yz}$ and the presence of object contact.

All inputs to the network were normalized (using an affine transform) to the range [−1 1] based on minimum and maximum values of the training data. Similarly, the r and φ network outputs are affinely transformed to the ranges of [0 L] and [−π π], where L represents the length of the whisker (e.g., units are arbitrary).

In an example, a total of eight hidden nodes were used for each of the MLP networks, yielding a total of 152 network weights to be tuned. For example, a real-valued genetic algorithm (GA) can be used for tuning of the network weights with the following attributes: population size=200, number of generations=400; initial population uniformly distributed within [−1 1]; Gaussian mutations, with standard deviation=0.02; uniform crossover; rank-based fitness selection, with the top 20% offspring surviving; and no elitism.

A fitness function can be defined as $$f = \sum_{i=1}^{n} (\delta_{tol} - \delta_i) \quad (3)$$

where n is a number of contact points with $C_i>0$, $\delta_i$ is a Cartesian distance between estimated and actual contact point, and $S_{tol}$ is the "error tolerance." Note that a given contact point will contribute to a positive fitness only if its error is less than the error tolerance; otherwise it will decrease the fitness. This is designed to reward/penalize a given contact point according to its degree of accuracy/inaccuracy. Setting $\delta_i$ too low can result in a large percentage of the contact being ignored (small n), and setting it too high can result in inaccurate contact points (large $\delta_i$) being retained.

In certain examples, a supervised learning approach can also be applied to neural network training in many cases, but could complicate the training of neural networks with recurrent connections.

Figure 9:
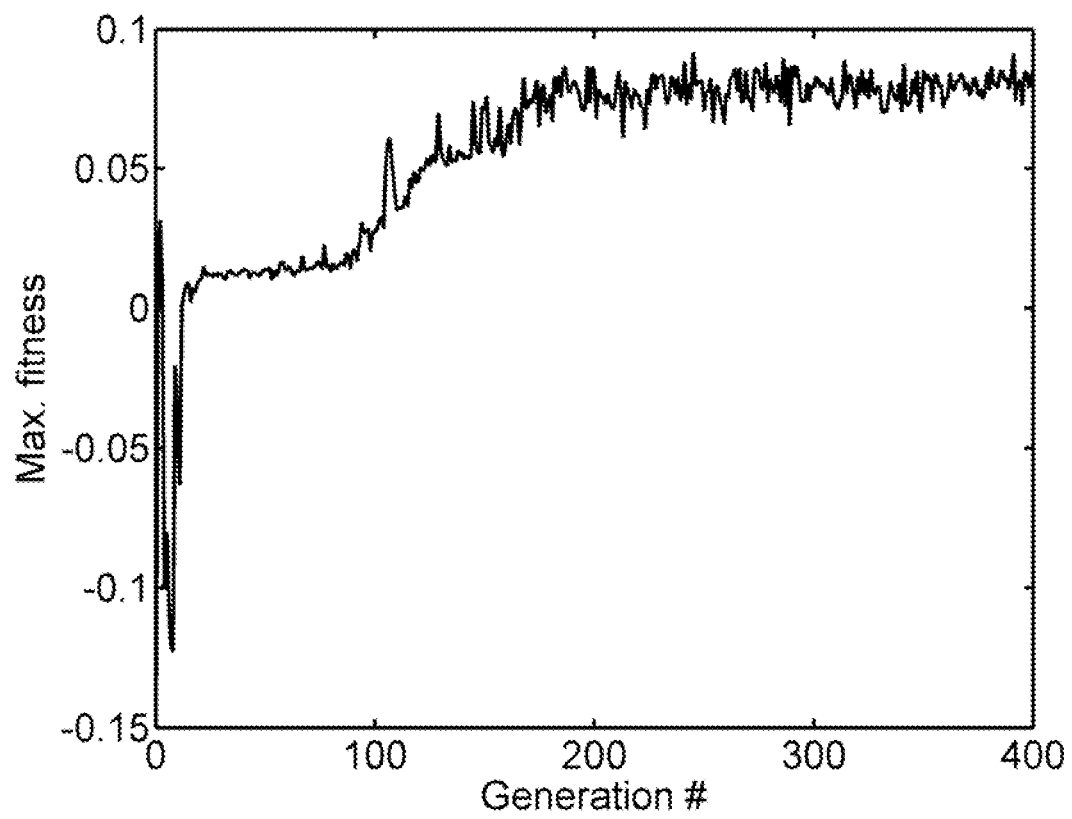
FIG. 9 shows example contact point extraction results from a real-valued genetic algorithm.

An example resulting run of the GA is plotted in FIG. 9. As shown in FIG. 9, fitness values quickly increase over the first 200 generations and then start to plateau. For the best individual of the final generation of the run, the average contact point error was 7.3%, and 29% of the contact points were evaluated. To confirm that the amount of training data was sufficient to allow the network performance to generalize to new objects, the best individual of the final generation was also tested on the test object, yielding 12.2% error and 26% of the contact points evaluated. This accuracy is within acceptable limits for many applications. Additionally, certain examples can refine the structure and training of the neural networks, incorporate sensor velocity and snout movement information, and/or hybridize the neural networks with an analytically derived model ("gray box" modeling), for example.

Thus, certain examples can apply to catheters and other objects at a variety of scales. Fluid flow, such as blood flow, can be capture around a whisker-based system, for example.

Certain examples include both long whiskers with significant dynamics (e.g., either tapered or not tapered), as well as short stubby hairs that serve more as proximity sensors. Either of those types of hairs (e.g., long or stubby) can be used to extract contours. Instead of or in addition to contour extraction, whisker arrays can be used for contact detection, proximity sensing, force measurement, and the like. Prediction of upcoming contours can be facilitated based on gathered data, for example.

In certain examples, the sensor array can be moved with respect to an object. In certain examples, the object can be moved respect to the whisker(s) of the sensor array. In certain examples, both the array and the object can be moved with respect to each other. Movement of the array can be arbitrary, for example.

Certain examples provide whiskers or other sensor members of various shape, in terms of both curvature profile and diameter profile. Array configurations can be arbitrary, for example. In certain examples, sensor member(s) can include deformable membrane surface(s) (skin) to which neural network techniques are applied. Such a membrane could be covered or embedded with sensors and the networks can learn to infer the surface shape from the sensor signals. In certain examples, an object can be coated with strain gages, and neural networks then learn to infer the object's surface shape (e.g., the object shape) based on the strain gage signals.

In certain examples, the scale and shape of the sensors, including total arc length, diameter profile (as a function of arc length), and curvature profile are not constrained. The scale and shape and configuration of the sensing array is also not limited. The presently described technology can work over any spatial scale. The number of sensors is not limited.

If the system has the capacity to measure the full 3-D force and moment at the base of the whisker and a single point contact is assumed, then the Euler-Bernoulli equation (starting from the base) can be incorporated to compute the full shape of the whisker and the location of the contact point.

The 3-D surface representation is not limited to any particular mathematical framework. Some possible options include 3-D contact point collections, tri-meshes, geometrical primitives, radial basis function network, artificial neuronal place cell firing rates.

Figure 10:
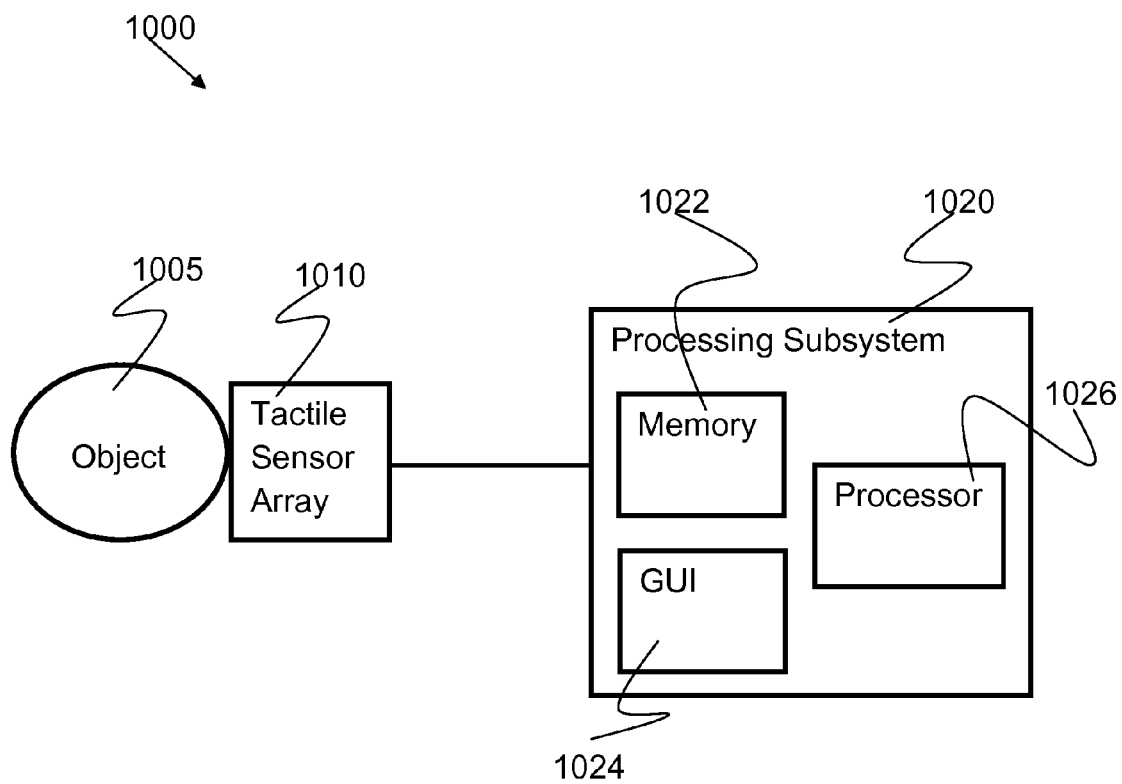
FIG. 10 illustrates an example 3-D reconstruction system to determine an object morphology and/or texture using an array of tactile sensors.

FIG. 10 illustrates an example 3-D reconstruction system 1000 to determine morphology (e.g., size, shape, orientation, and/or position) and/or texture of an arbitrary object using an array of tactile sensors. The system 1000 includes an array of tactile sensors 1010. The array 1010 is in communication with a processing subsystem 1020 to transfer data obtained by the array of sensors 1010 in contact with an object 1005 to the processing unit 1020.

The processing subsystem 1020 includes a memory 1022, an interface 1024, and a processor 1026. Data from the sensor array 1010 can be stored in the memory 1022, output via the interface 1024, and processed by the processor 1026. The processor 1026 can be used to train the sensor array 1010 and/or one or more neural network(s) and/or other processing systems/structures associated with the processor 1026. The processor 1026 can also be used to provide a 3-D reconstruction with respect to an object 1005 in contact with the sensor array 1010. Processing can involve passing sensor input data through one or more neural networks and/or other analytics/numerical analysis, such as Multilayer perception, with or without feedback; Radial basis function (RBF) network; Hopfield network; Elman network; Stochastic neural network; Continuous time recurrent neural network; Topology and Weight Evolving Artificial Neural Network (TWEANN); Compositional Pattern Producing Network (CPPN), etc. Analytic and/or numerical approaches can also be "hybridized" into a neural network framework, by using their outputs as network inputs (e.g., "features"). The neural network(s) can process sensor input data using a Contact Point Estimation algorithm, as described above, or other similar method to determine coordinates for points of contact by sensors 1010 against the object 1005. The 3-D reconstruction can include a 3-D morphology (e.g., size, shape, orientation, and/or position) and/or texture, for example. The 3-D reconstruction can be displayed, saved, forwarded to another recipient, and the like.

Figure 11:
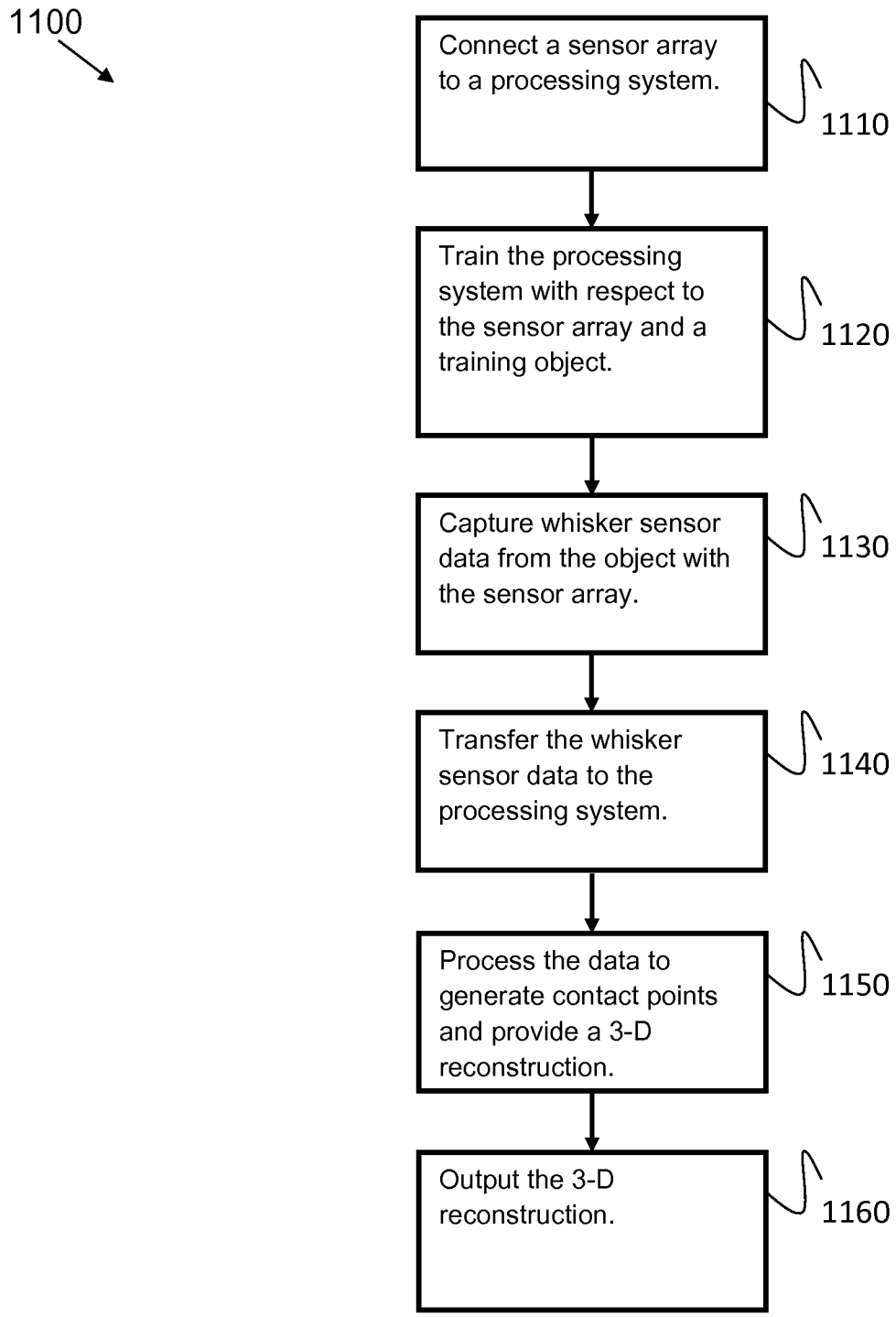
FIG. 11 illustrates a flow diagram for an example method for 3-D object reconstruction.

FIG. 11 illustrates a flow diagram for a method 1100 for 3-D object reconstruction. FIG. 11 depicts an example flow diagram representative of processes that can be implemented using, for example, computer readable instructions that can be used to facilitate 3-D reconstruction. The example processes of FIG. 11 (and of other figures, such as FIG. 2) can be performed using a processor, a controller and/or any other suitable processing device. For example, the example processes of FIG. 11 can be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example processes of FIG. 11 can be implemented using coded instructions (e.g., computer readable instructions) stored on a non-transitory computer readable medium such as a flash memory, a read-only memory (ROM), a random-access memory (RAM), a CD, a DVD, a Blu-ray, a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIG. 11 can be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIG. 11 can be implemented manually or as any combination(s) of any of the foregoing techniques, for example, any combination of firmware, software, discrete logic and/or hardware. Further, although the example processes of FIG. 11 are described with reference to the flow diagram of FIG. 11, other methods of implementing the processes of FIG. 11 may be employed. For example, the order of execution of the blocks can be changed, and/or some of the blocks described may be changed, eliminated, sub-divided, or combined. Additionally, any or all of the example processes of FIG. 11 can be performed sequentially and/or in parallel by, for example, separate processing threads, processors, devices, discrete logic, circuits, etc.

At 1110, a tactile sensor array is connected to a processing system for 3-D reconstruction of an object. For example, a whisker or fiber-based array of sensors is connected to a computer to receive and process tactile sense data.

At 1120, the processing system is trained to operate with the sensor array with respect to a training object. For example, a neural network associated with data gathered from the sensor array is trained.

At 1130, tactile sensor data is captured by the sensory array in contact with an object to be reconstructed. For example, data points corresponding to contact between whiskers in an array and a human face is captured by the sensor array.

At 1140, the tactile sensor data is transferred to the processing system from the sensor array. At 1150, the gathered contact data is processed to generate contact points and provide a 3-D reconstruction with respect to the object. Processing can involve passing sensor input data through one or more neural networks and/or other analytics/numerical analysis, such as Multilayer perception, with or without feedback; Radial basis function (RBF) network; Hopfield network; Elman network; Stochastic neural network; Continuous time recurrent neural network; Topology and Weight Evolving Artificial Neural Network (TWEANN); Compositional Pattern Producing Network (CPPN), etc. Analytic and/or numerical approaches can also be "hybridized" into a neural network framework, by using their outputs as network inputs (e.g., "features"). The neural network(s) can process sensor input data using a Contact Point Estimation algorithm, as described above, or other similar method to determine coordinates for points of contact by sensors against the object. The 3-D reconstruction can include a 3-D morphology (e.g., size, shape, orientation, and/or position) and/or texture, for example. At 1160, the 3-D reconstruction of the object is output. The 3-D reconstruction can be displayed, saved, forwarded to another recipient, and the like.

Figure 12:
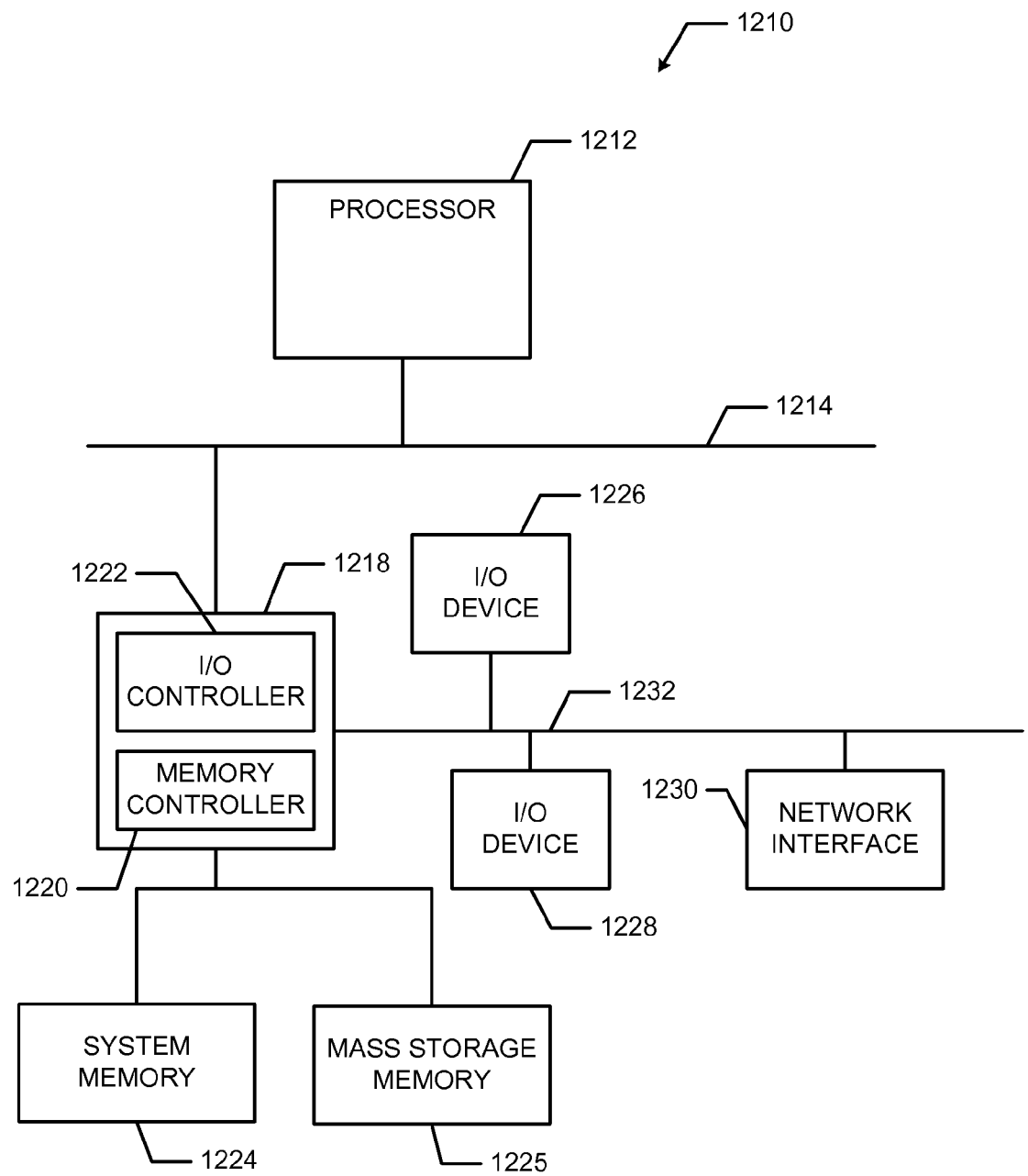
FIG. 12 is a block diagram of an example processor system that can be used to implement systems, apparatus, and methods described herein.

FIG. 12 is a block diagram of an example processor system 1210 that may be used to implement systems, apparatus, and methods described herein. As shown in FIG. 12, the processor system 1210 includes a processor 1212 that is coupled to an interconnection bus 1214. The processor 1212 may be any suitable processor, processing unit, or microprocessor, for example. Although not shown in FIG. 12, the system 1210 may be a multi-processor system and, thus, may include one or more additional processors that are identical or similar to the processor 1212 and that are communicatively coupled to the interconnection bus 1214.

The processor 1212 of FIG. 12 is coupled to a chipset 1218, which includes a memory controller 1220 and an input/output ("I/O") controller 1222. As is well known, a chipset typically provides I/O and memory management functions as well as a plurality of general purpose and/or special purpose registers, timers, etc. that are accessible or used by one or more processors coupled to the chipset 1218. The memory controller 1220 performs functions that enable the processor 1212 (or processors if there are multiple processors) to access a system memory 1224 and a mass storage memory 1225.

The system memory 1224 may include any desired type of volatile and/or non-volatile memory such as, for example, static random access memory (SRAM), dynamic random access memory (DRAM), flash memory, read-only memory (ROM), etc. The mass storage memory 1225 may include any desired type of mass storage device including hard disk drives, optical drives, tape storage devices, etc.

The I/O controller 1222 performs functions that enable the processor 1212 to communicate with peripheral input/output ("I/O") devices 1226 and 1228 and a network interface 1230 via an I/O bus 1232. The I/O devices 1226 and 1228 may be any desired type of I/O device such as, for example, a keyboard, a video display or monitor, a mouse, etc. The network interface 1230 may be, for example, an Ethernet device, an asynchronous transfer mode ("ATM") device, an 802.11 device, a DSL modem, a cable modem, a cellular modem, etc. that enables the processor system 1210 to communicate with another processor system.

While the memory controller 1220 and the I/O controller 1222 are depicted in FIG. 12 as separate blocks within the chipset 1218, the functions performed by these blocks may be integrated within a single semiconductor circuit or may be implemented using two or more separate integrated circuits.

Certain embodiments contemplate methods, systems and computer program products on any machine-readable media to implement functionality described above. Certain embodiments may be implemented using an existing computer processor, or by a special purpose computer processor incorporated for this or another purpose or by a hardwired and/or firmware system, for example.

Some or all of the system, apparatus, and/or article of manufacture components described above, or parts thereof, can be implemented using instructions, code, and/or other software and/or firmware, etc. stored on a machine accessible or readable medium and executable by, for example, a processor system. When any of the appended claims are read to cover a purely software and/or firmware implementation, at least one of the components is hereby expressly defined to include a tangible medium such as a memory, DVD, Blu-ray, CD, etc. storing the software and/or firmware.

One or more of the components of the systems and/or steps of the methods described above may be implemented alone or in combination in hardware, firmware, and/or as a set of instructions in software, for example. Certain embodiments may be provided as a set of instructions residing on a computer-readable medium, such as a memory, hard disk, DVD, Blu-ray disc, or CD, for execution on a general purpose computer or other processing device. Certain embodiments of the present invention may omit one or more of the method steps and/or perform the steps in a different order than the order listed. For example, some steps may not be performed in certain embodiments of the present invention. As a further example, certain steps may be performed in a different temporal order, including simultaneously, than listed above.

Certain embodiments contemplate methods, systems and computer program products on any machine-readable media to implement functionality described above. Certain embodiments may be implemented using an existing computer processor, or by a special purpose computer processor incorporated for this or another purpose or by a hardwired and/or firmware system, for example.

One or more of the components of the systems and/or steps of the methods described above may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device. Certain embodiments of the present invention may omit one or more of the method steps and/or perform the steps in a different order than the order listed. For example, some steps may not be performed in certain embodiments of the present invention. As a further example, certain steps may be performed in a different temporal order, including simultaneously, than listed above.

Certain embodiments include computer-readable media for carrying or having computer-executable instructions or data structures stored thereon. Such computer-readable media may be any available media that may be accessed by a general purpose or special purpose computer or other machine with a processor. By way of example, such computer-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of computer-executable instructions or data structures and which can be accessed by a general purpose or special purpose computer or other machine with a processor. Combinations of the above are also included within the scope of computer-readable media. Computer-executable instructions comprise, for example, instructions and data which cause a general purpose computer, special purpose computer, or special purpose processing machines to perform a certain function or group of functions.

Generally, computer-executable instructions include routines, programs, objects, components, data structures, etc., that perform particular tasks or implement particular abstract data types. Computer-executable instructions, associated data structures, and program modules represent examples of program code for executing steps of certain methods and systems disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of embodiments of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated computer-readable media provide nonvolatile storage of computer-executable instructions, data structures, program modules and other data for the computer.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A computer-implemented method for three-dimensional object reconstruction using an array of tactile sensors, said method comprising:
   (a) receiving sensory data from said array of tactile sensors with respect to contact with an object in a reference coordinate system,
      i) wherein bases of said tactile sensors are arranged on a surface,
      ii) wherein said array of tactile sensors and said surface, as a unit, are actuatable with unconstrained motion, wherein said surface is actuatable in at least one degree of freedom and wherein said tactile sensors are independently actuatable with respect to said surface, and
      iii) wherein said array of tactile sensors is to contact said object with more than one degree of freedom during sensing to generate said sensory data;
   (b) processing said sensory data using a neural network to estimate a coordinate for each contact point between said array of tactile sensors and said object;
   (c) reconstructing a three-dimensional morphology of said object based on the sensory data processed using said neural network; and
   (d) outputting the three-dimensional morphology of said object.

2. The method of claim 1, further comprising training the neural network to estimate contact point locations and to perform three-dimensional reconstruction using data from the array of tactile sensors and a known test object.

3. The method of claim 1, wherein processing further comprises processing the sensory data using the neural network to apply contact point estimation to estimate spherical coordinates for a contact point location relative to a base of the array of sensors and to map the spherical coordinates to the reference coordinate system using a known position and orientation of the base of the array of sensors.

4. The method of claim 3, wherein the neural network applies the contact point estimation algorithm to generate a confidence value that is associated with the contact point to indicate a reliability of the contact point location estimation.

5. The method of claim 4, wherein a negative confidence value causes the contact point to be ignored in reconstructing the three-dimensional morphology.

6. The method of claim 1, wherein processing further comprises processing the sensory data using the neural network to generate a sensor trajectory including position and angle in the reference coordinate system.

7. The method of claim 1, wherein the three-dimensional morphology comprises at least one of shape, size, orientation, and position.

8. The method of claim 1, wherein reconstructing further comprises reconstructing a texture of the object.

9. A three-dimensional reconstruction system comprising:
   (a) an array of tactile sensors to contact an object to obtain sensory data regarding said object,
      i) wherein bases of said tactile sensors are arranged on a surface,
      ii) wherein said array of tactile sensors and said surface, as a unit, are actuatable with unconstrained motion, wherein said surface is actuatable in at least one degree of freedom and wherein said tactile sensors are independently actuatable with respect to said surface, and
      iii) wherein said array of tactile sensors is to contact said object with more than one degree of freedom during sensing to generate said sensory data; and
   (b) a processor to provide a neural network to process said sensory data to estimate a location for each contact point between a sensor in said array of sensors and said object, wherein said processor is to reconstruct a three-dimensional morphology of the object based on said sensory data processed using said neural network and output the three-dimensional morphology of said object to a user.

10. The system of claim 9, wherein the array of tactile sensors comprises an array of flexible sensors extending from said surface.

11. The system of claim 9, wherein the array of tactile sensors comprises an array of sensors embedded in a deformable surface.

12. The system of claim 9, wherein the array of tactile sensors is to provide data to the processor to enable said processor to measure a distribution of stresses and strains within the array of sensors.

13. The system of claim 9, wherein the array of sensors is to be moveable with respect to the object.

14. The system of claim 9, wherein the object is to be moveable with respect to the array of sensors.

15. The system of claim 9, wherein the neural network comprises at least one of a multilayer perceptron neural network, a radial basis function neural network, a Hopfield neural network, an Elman neural network, a Stochastic neural network, a continuous time recurrent neural network, a topology and weight evolving artificial neural network, and a compositional pattern producing neural network.

16. The system of claim 9, wherein one or more analytic and numerical approaches are to be hybridized into a neural network framework by using their outputs as neural network inputs.

17. The system of claim 9, wherein the processor is to process the sensory data using the neural network to apply contact point estimation to estimate spherical coordinates for a contact point location relative to a base of the array of sensors and to map the spherical coordinates to a reference coordinate space using a known position and orientation of the base of the array of sensors.

18. The system of claim 17, wherein the neural network is to apply the contact point estimation algorithm to generate a confidence value that is associated with the contact point to indicate a reliability of the contact point location estimation.

19. The system of claim 18, wherein a negative confidence value causes the contact point to be ignored in reconstructing the three-dimensional morphology.

20. The system of claim 9, wherein the processor is to process the sensory data using the neural network to generate a sensor trajectory including position and angle in the reference coordinate system.

21. The system of claim 9, wherein the three-dimensional morphology comprises at least one of shape, size, orientation, and position.

22. The system of claim 9, wherein the processor is to reconstruct a texture of the object.

23. The method of claim 1, wherein at least one of said array of tactile sensors and said surface is actuated and the other of said array of tactile sensors and said surface is not actuated.

24. The method of claim 1, wherein said array of tactile sensors is actuated and said surface is actuated.

25. The method of claim 1, wherein said object is moved in contact with said array of tactile sensors.

26. The method of claim 1, wherein said sensory data is to be generated by said array of tactile sensors when at least one of said array of tactile sensors bends out of a plane of contact between said array of tactile sensors and said object.

27. The method of claim 1, wherein said sensory data comprises a moment M having at least a z-axis component $M_z$ and a y-axis component $M_y$, an arctangent a tan($M_z/M_y$), and an x-axis force component $F_x$ at the base of said array of tactile sensors.

\* \* \* \* \*